United States Patent [19]

Sogo et al.

[11] Patent Number: 4,683,771
[45] Date of Patent: Aug. 4, 1987

[54] GEAR-TEETH PROTECTOR IN CHANGE-SPEED GEARING UNITS

[75] Inventors: Yoshitaka Sogo; Masami Fukushima; Tetsuro Kuzuya, all of Toyota, Japan

[73] Assignee: Toyota Jidosha Kogyo Kabushiki Kaisha, Aichi, Japan

[21] Appl. No.: 249,491

[22] Filed: Mar. 31, 1981

[30] Foreign Application Priority Data

Aug. 20, 1980 [JP] Japan .................. 55-117920[U]

[51] Int. Cl.⁴ .............................................. F16H 57/04
[52] U.S. Cl. ................................... 74/467; 74/606 R; 74/608; 184/6.12; 184/11.1
[58] Field of Search ............. 74/467, 608, 609, 600 R, 74/606 A; 184/11 R, 6.12

[56] References Cited

U.S. PATENT DOCUMENTS 2,645,305 7/1953 Roos ........................................ 184/11
4,231,266 11/1980 Nishikama et al. ................ 184/11 R
4,305,686 12/1981 Magill ........................... 74/605 R X

FOREIGN PATENT DOCUMENTS 2549990 7/1975 Fed. Rep. of Germany .... 74/606 R

Primary Examiner—Gary L. Smith
Attorney, Agent, or Firm—Armstrong, Nikaido, Marmelstein & Kubovcik

[57] ABSTRACT

A gear-teeth protector for a change-speed gearing unit in which a pair of upper and lower change-speed gears of high meshing rate are arranged adjacent to an upright wall in a housing for the gearing unit. The gear-teeth protector comprises a U-shaped shroud member secured at its outer peripheral flanges to one face of the upright wall so as to prevent metallic alien particles being trapped between the change-speed gears, the shroud member forming a pair of side walls enclosing the teeth on the upper change-speed gear and extending adjacent to the upper teeth on the lower change-speed gear to enclose the meshing engagement portion between the two change-speed gears.

4 Claims, 4 Drawing Figures

: 
GEAR-TEETH PROTECTOR IN CHANGE-SPEED GEARING UNITS

BACKGROUND OF THE INVENTION

The present invention relates to change-speed gearing units for automobiles, and more particularly to a device for preventing metallic alien particles being trapped between a pair of change-speed gears of high meshing rate in the gearing unit.

In order to reduce meshing noises within a change-speed gearing unit, it is effective to increase the meshing rate of the change-speed gears. In one of the two usual manners for increasing the meshing rate, it is required to make each module of the gears as small as possible, and in the other usual manner it is required to make the whole depth of each tooth on the gears as great as possible. As a result of these requirements, each tooth tip on the gears is inevitably tapered, and the face of each tooth tip becomes narrow, which results in a reduction in the strength of each tooth tip on the gears. In the case that metallic alien matter such as worn-off metallic particles, metallic residue from the grinding of the shaft and gears, etc is trapped between the teeth of the gears, there will occur some damage to the teeth tips on the gears. On the other hand, it is very difficult to completely eliminate the metallic alien matter so as to avoid such damage in the actual use of the gearing unit.

SUMMARY OF THE INVENTION

It is, therefore, a primary object of the present invention to provide a device for preventing metallic alien particles being trapped between small module gears in a simple construction within the limited space of a change-speed gearing unit.

In a preferred embodiment of the present invention, the above object is accomplished by provision of a gear-teeth protector for a change-speed gearing unit in which a pair of upper and lower change-speed gears of high meshing rate are arranged adjacent to an upright wall in a housing for the gearing unit, the gear-teeth protector comprising a U-shaped shroud member secured at its outer peripheral flanges to one face of the upright wall so as to prevent metallic alien particles being trapped between the change-speed gears. The shroud member provides a pair of side walls enclosing the teeth on the upper change-speed gear and extending adjacent to the upper teeth on the lower change-speed gear to enclose the meshing engagement portion between the two change-speed gears.

It is preferable that the shroud member be integrally formed at one end thereof with a U-shaped inner peripheral flange which is arranged to cover an opening remaining inside the two side walls around the upper and lower change-speed gears.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
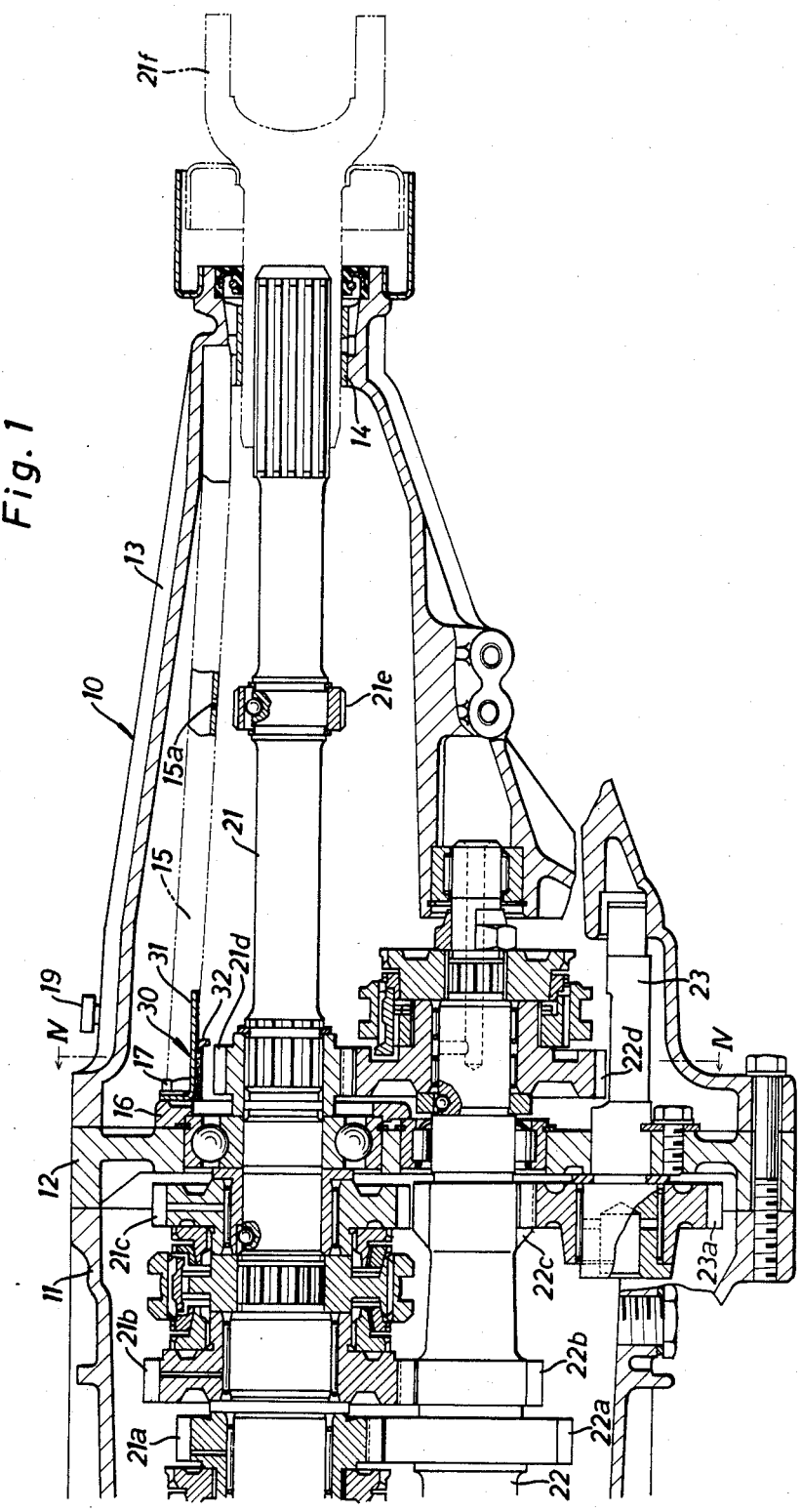
FIG. 1 is a sectional view of a change-speed gearing unit equipped with a gear-teeth protector in accordance with the present invention.

Referring now to the drawings, FIG. 1 illustrates the rear interior of a change-speed gearing unit of the remote control type of which the housing assembly 10 includes a transmission casing 11 and an extension housing 13 secured in a fluid-tight manner to each other by way of an upright intermediate plate 12. Arranged within the housing assembly 10 are an output shaft 21, a countershaft 22 and an idler shaft 23 in parallel with each other. The output shaft 21 is provided thereon with change-speed gears 21a, 21b, 21c and 21d of differing sizes which are meshed respectively with the corresponding change-speed gears 22a, 22b, 22c and 22d on countershaft 22. The idler shaft 23 is provided thereon with a reverse idler gear 23a in mesh with the change-speed gear 22c, and it is located substantially at the same height above the ground level as the countershaft 22. In FIG. 1, the idler shaft 23 is, however, illustrated at a position lower than the countershaft 22 to clearly depict the meshing engagement of the gearing unit.

The output shaft 21 is also provided thereon with a speedometer drive gear 21e and is splined at its rear end with a sleeve-like yoke 21f. The sleeve-like yoke 21f is rotatably and axially slidably supported by a rear bushing 14 carried in the rear end portion of extension housing 13. In addition, the speedometer gear portion is arranged to be lubricated by lubricating oil dropping from an opening 15a of an oil transfer trough 15 which is bridged between the intermediate plate 12 and the rear end portion of extension housing 13; and the rear bushing 14 is also arranged to be lubricated by lubricating oil supplied through the trough 15.

In this embodiment, it is noted that the change-speed gears 21d and 22d are arranged adjacent to the rear face of upright intermediate plate 12 to provide an overdrive gear train, and that each of change-speed gears 21d and 22d is in the form of a small module gear. A gear-teeth protector assembly 30 is fixedly attached to the rear face of intermediate plate 12 by means of bolts 17 which are adapted to secure a bearing retainer 16 to the intermediate plate 12. As can be well seen in FIGS. 2 and 3, the gear-teeth protector assembly 30 includes an oil buffer plate 31 and a U-shaped shroud member 32, both of pressed sheet metal, which are integrally welded to each other at the fitted portion thereof. As can be well seen in FIGS. 1 and 4, the oil buffer plate 31 is located above the upper change-speed gear 21d to interrupt, for the most part, the upward flow of lubricating oil directed to an air breather 19 on the extension housing 13, the liquid surface of the stored oil being indicated by imaginary lines in FIG. 4.

Figure 3:
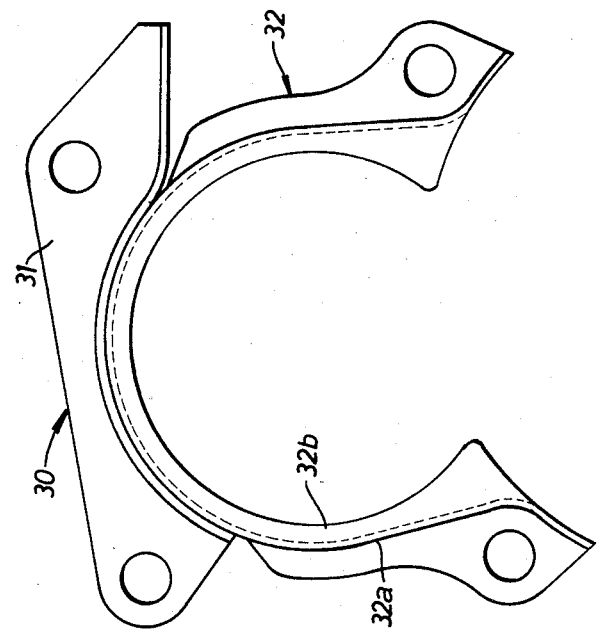
FIG. 3 is a front view of the shroud member of FIG. 2.
Figure 2:
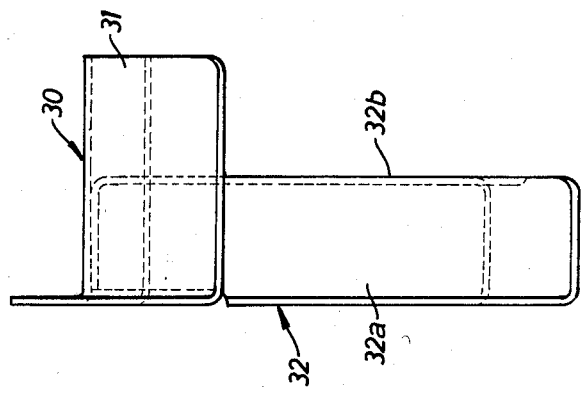
FIG. 2 is a side view of the shroud member shown in FIG. 1.
Figure 4:
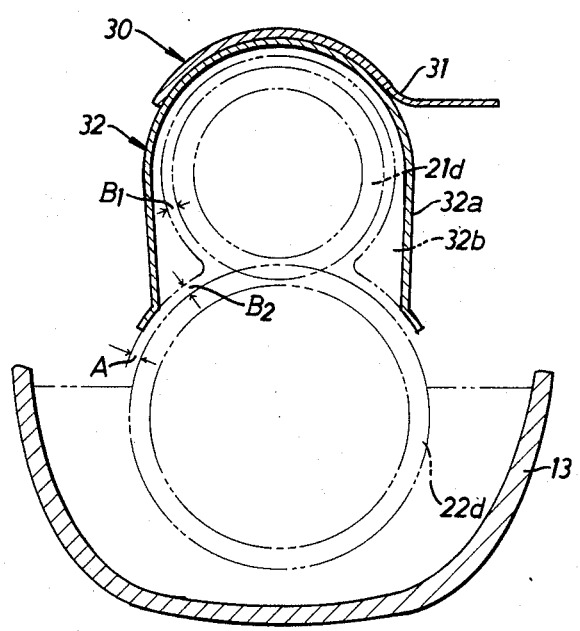
FIG. 4 illustrates the arrangement of the shroud member in relation to upper and lower change-speed gears of the change-speed gearing unit.

As can be well seen in FIGS. 2, 3 and 4, the shroud member 32 is formed at its front end with a pair of outer peripheral flanges to be attached to the rear face of intermediate plate 12 and provides a pair of side walls 32a, 32a which are arranged to enclose the teeth on the upper change-speed gear 21d except for its meshing engagement portion and to enclose the upper teeth on the lower change-speed gear 22d adjacent to its meshing engagement portion. The shroud member 32 is also formed at its rear end with a U-shaped inner peripheral flange 32b which is arranged to cover an opening remaining inside the two side walls 32a around the upper and lower change-speed gears 21d and 22d. In the above arrangement, it is preferable that the pair of clearances A between the side walls 32a and the lower change-speed gear 22d and the two pairs of clearances $B_1$ and $B_2$ between the inner peripheral flange 32b and the change-speed gears 21d and 22d be as small as possible without causing any interference in operation.

Under inoperative condition of the change-speed gears 21d and 22d, metallic alien particles remain at the bottom of extension housing 13. When the stored lubricating oil is picked up by forward or reverse rotation of the gears, the metallic alien particles are splashed against the inner wall of extension housing 13 together with the picked up lubricating oil due to centrifugal force and then rebounded to the outer face of shroud member 32. Thus, the side walls 32a and the inner peripheral flange 32b of shroud member 32 serve to prevent the alien particles being trapped between the change-speed gears 21d and 22d. This serves to avoid damage to the teeth tips on the gears caused by the alien particles and to enhance durability of the gears.

In the above embodiment, it will be noted that the inner peripheral flange 32b of shroud member 32 effectively prevents entrance of the alien particles into the meshing engagement portion of the two gears from the rear side thereof. In the case that there is no possibility of such entrance of the alien particles from the rear side of the gears, the inner peripheral flange 32b may be eliminated.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A gear-teeth protector for a change-speed gearing unit in which a pair of meshingly engaged upper and lower, changed-speed, toothed gears of high meshing rate are arranged adjacent to an upright wall in a housing for said gearing unit, said gear-teeth protector comprising a U-shaped shroud member secured to one face of said upright wall for preventing metallic alien particles being trapped between said change-speed gears, said shroud member forming a pair of side walls enclosing the teeth on said upper change-speed gear and extending below the meshing portion of said lower change-speed speed gear to enclose the meshing engagement portion between said two change-speed gears.

2. A gear-teeth protector as claimed in claim 1, wherein said shroud member is integrally formed at one end thereof with a U-shaped inner peripheral flange which is arranged to cover an opening remaining inside said two side walls around said upper and lower change-speed gears.

3. A gear-teeth protector as claimed in claim 1, further comprising a buffer plate secured to said shroud member for interrupting the upward flow of lubricating oil picked up by rotation of said change-speed gears.

4. In a transmission having a housing, an upright wall within said housing, and upper and lower change-speed gears arranged in a common vertical plane adjacent to and parallel to the plane of said upright wall and having teeth in meshing engagement with each other, a gear-teeth protector comprising a U-shaped shroud member having a side wall and inner and outer peripheral flanges and formed to substantially enclose the teeth of said upper gear and the upper teeth of said lower gear, said outer peripheral flange being fixedly attached to said upright wall to position said protector about said gears whereby splashed oil carrying metallic particles is prevented from impinging on said gear teeth.

* * * * *